United States Patent

[11] 3,610,445

| [72] | Inventors | Robert L. Kitchen<br>Riverside, Calif.;<br>David W. Stallard, Winfield, Ill. |
|---|---|---|
| [21] | Appl. No. | 867,455 |
| [22] | Filed | Oct. 20, 1969 |
| [45] | Patented | Oct. 5, 1971 |
| [73] | Assignees | Westinghouse Electric Corporation<br>Pittsburgh, Pa.;<br>Alvey Conveyor Manufacturing Company<br>St. Louis, Mo., part interest to each |

[54] WAREHOUSE STORAGE SYSTEM AND RETRIEVING DEVICE THEREFOR
6 Claims, 13 Drawing Figs.
[52] U.S. Cl. .................................................. 214/16.4 A,
198/127, 214/16.1 CF
[51] Int. Cl. ......................................................... B65g 1/06
[50] Field of Search ............................................. 214/16.42,
16.18 B

[56] References Cited
UNITED STATES PATENTS

| 2,705,570 | 4/1955 | Maissian ..................... | 214/16.1 |
| 3,027,022 | 3/1962 | Peras .......................... | 214/16.42 |
| 3,075,659 | 1/1963 | Sylvester et al ............. | 214/16.42 |

Primary Examiner—Gerald M. Forlenza
Assistant Examiner—Lawrence J. Oresky
Attorney—Gravely, Lieder & Woodruff

ABSTRACT: A warehousing system having remote controlled components for transferring items from an infeed conveyor to selected storage conveyors in a storage rack and for retrieving the items therefrom and depositing them on a discharge conveyor. The storage conveyors in such a system are provided with rollers on which the items rest and the retrieving unit, which retrieves items from the storage conveyors, includes an extractor belt which engages the rollers, rotates them, and thereby shifts the items onto a waiting supporting bed on the retrieving unit.

WAREHOUSE STORAGE SYSTEM AND RETRIEVING DEVICE THEREFOR

This invention relates in general to a warehousing system having a storage rack and means for charging items into and retrieving them from the rack, and is more particularly concerned with means to rapidly retrieve items from the storage rack.

While many manufacturing operations have been mechanized to the extend that they are almost fully automatic, warehouses to hold the products of such manufacturing operations have failed to keep pace with that automation. Indeed, most warehouses today relay primarily on manual labor to both stock and retrieve items from their shelves, just as has been carried on for many years. By reason of this dependence on manual labor, warehousing costs are high. Moreover, the conventional warehouse employing even a few men is not suitably adapted for so-called running inventories in which the exact inventory of any item is known at any instant, inasmuch as the chances of someone failing to record a transaction are quite high, especially during periods of great demand for the warehouse's products.

One of the principal objects of the present invention is to provide a warehousing system for storing an retrieving items with a minimum amount of manual labor.

Another object is to provide a warehousing system in which a multitude of different items may be stored.

A further object is to provide a warehousing system which is simple and rugged in construction and economical to manufacture.

An additional object is to provide a retrieving device for rapidly and gently withdrawing items from a storage rack and transferring such items to a predetermined location.

These and other objects and advantages will become apparent hereinafter.

The present invention is embodied in a warehousing device including a storage conveyor onto which items are discharged by a charging unit which moves between the storage conveyor and a predetermined point remote from it. The warehousing device also includes a retrieving unit for removing items from the conveyor and depositing them at a remote predetermined location. The invention is further embodied in a storage and retrieving system including a frame and a receiving bed on the frame for receiving items stored on a storage bed. The frame further carries an extractor which activates a surface forming part of the storage bed and thereby moves the load onto receiving means on the frame.

The invention also consists in the parts and in the arrangements and combinations of parts hereinafter described and claimed. In the accompanying drawings which form part of the specification and wherein like numerals and letters refer to like parts wherever they occur:

10—10 and 11 are sectional views taken along lines 10—10 and 11—11, respectively, of FIG. 9.

Referring now in detail to the drawings, 2 designates an automatic warehousing device which broadly includes an infeed conveyor 4, a charging unit 6, a storage rack 8, a retrieving unit 10, and a discharge conveyor 12, all of which are contained within a warehouse 14 or some other suitable facility.

Figure 1:
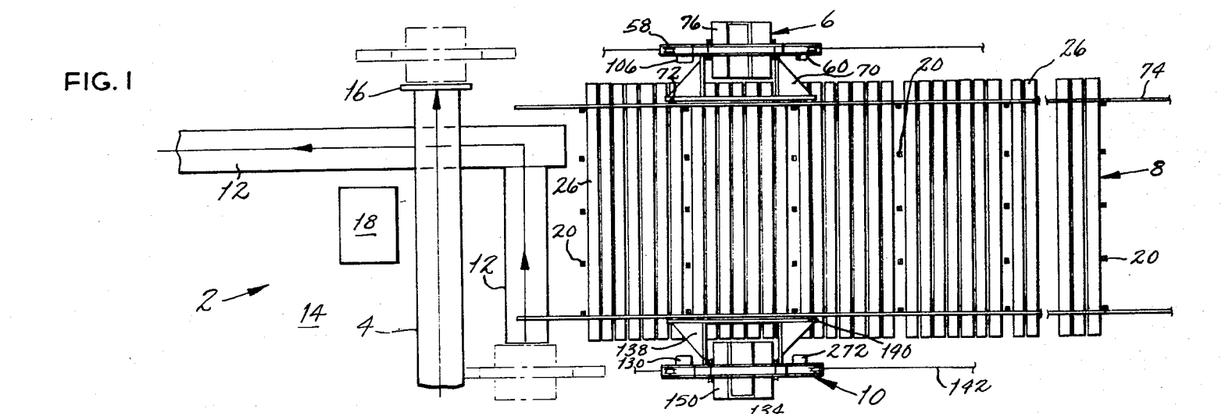
FIG. 1 is a plan view of a warehousing device constructed in accordance with and embodying the present invention.

Referring now to FIG. 1, the infeed conveyor 4, which is provided at its discharge end with a retractable gate 16, extends parallel to a portion of the discharge conveyor 12, and the parallel portions of these conveyors 4 and 12 terminate in alignment with the opposite sides of the storage rack 8. At any convenient location where the conveyors 4 and 12 pass in close proximity to one another a control console 18 is located and this console 18 is manned by a single operator who can observe loads on both conveyors 4 and 12 from his position behind it.

Figure 2:
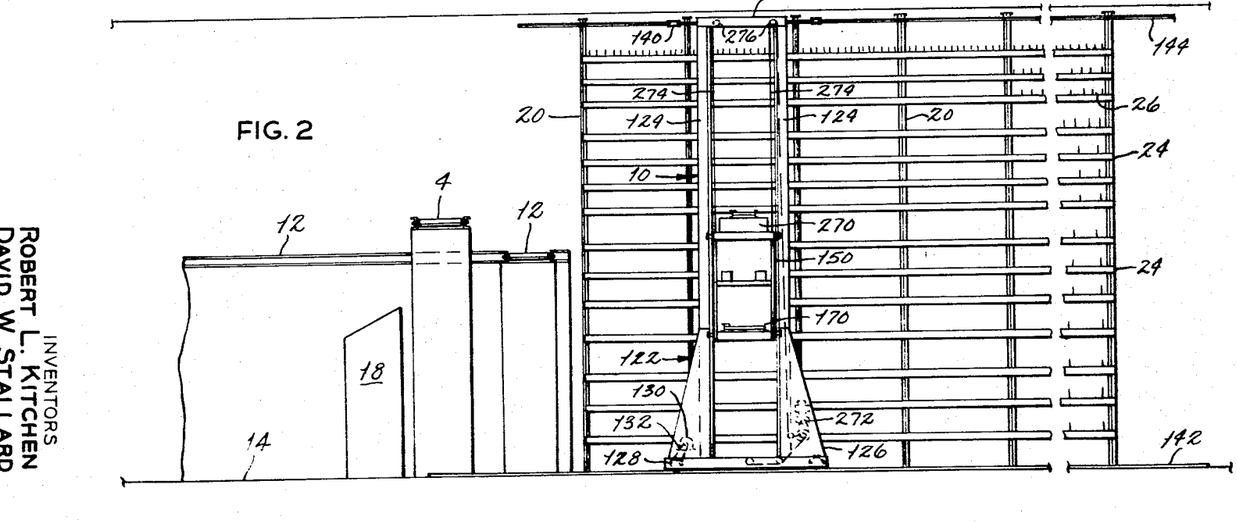
FIG. 2 is a side elevational view of the warehousing device showing the retrieval side of the storage rack.
Figure 3:
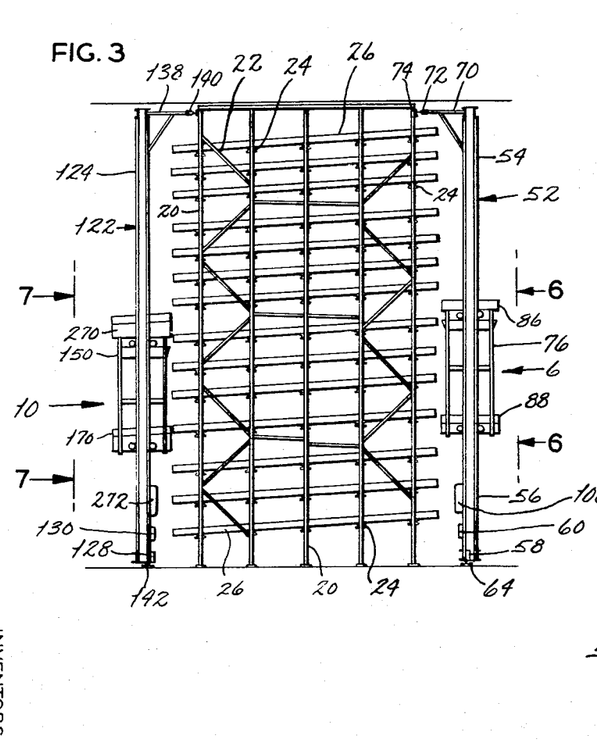
FIG. 3 is an end elevational view of the warehousing device.

Turning now to FIGS. 2 and 3, the storage rack 8 comprises a plurality of upstanding support members 20 arranged in longitudinally and laterally extending rows and rigidified by means of cross bracing 22. Each upstanding member 20 of a longitudinal row is connected by horizontal support channels 24 arranged in pairs at vertically spaced intervals, and the channels 24, in turn, carry transversely extending storage conveyors 26. From the charging side to the retrieving side of the rack 8, that is to say from the right to the left side as seen side as seen in FIG. 3, the support channels 24 of any row are disposed slightly below the corresponding channels 24 in the preceding row so that the storage conveyors 26 are inclined downwardly toward the retrieving side of the rack 8.

Figure 4:
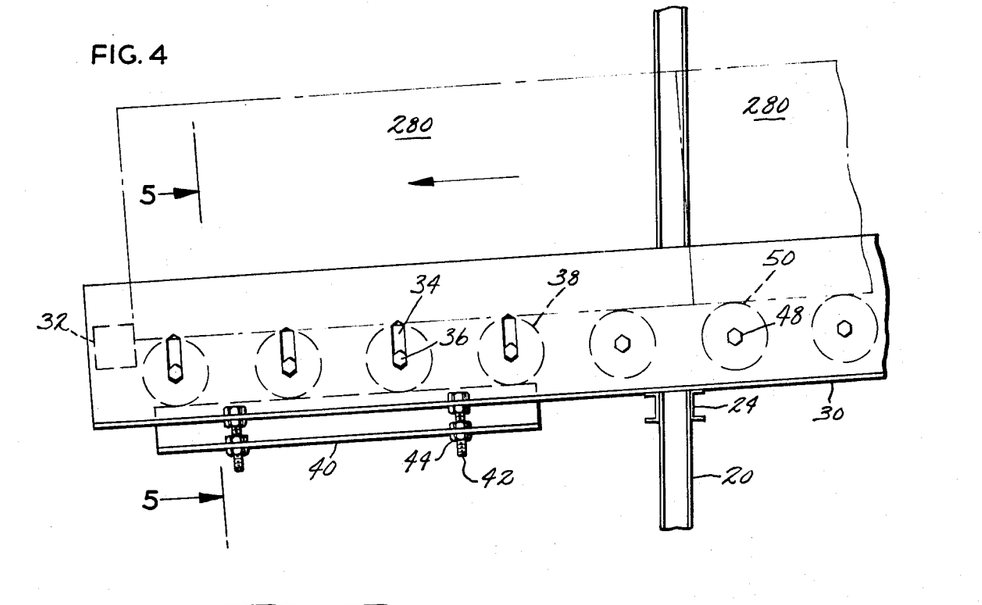
FIG. 4 is an enlarged fragmentary elevational view of the end of one of the storage conveyors.
Figure 5:
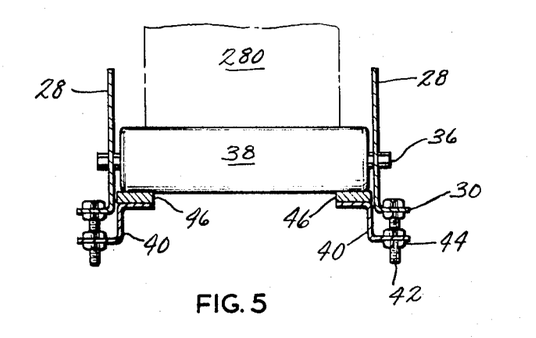
FIG. 5 is a sectional view taken along line 5—5 of FIG. 4.

AS will be seen by reference to FIGS. 4 and 5, each storage conveyor 26 includes a pair of parallel upstanding sideplates 28 provided along their lower margins with outwardly projecting flanges 30 which are bolted to the upper flanges of the support channels 24. At the retrieving side of the rack 8, the sideplates 28 of each storage conveyor 26 are connected by a transverse stop member 32, and immediately inwardly from the stop member 32, the sideplates 28 are provided with a plurality of spaced elongated slots 34 (FIG. 4), the longitudinal axes of which are presented perpendicular to the flanges 30. Fitted into the slots 34 and extending between the sideplates 28 are shiftable axles 36 having shiftable rollers 38 journaled on them. When the axles 36 are at the lower ends of the slots 34, the plane or upper surface of the storage bed formed by the rollers 38 is presented below the upper edge of the stop member 32, but when the axles 36 are raised to the upper ends of the slots 34, the bed formed by the rollers 38 is presented below the upper edge of the stop member 32, but when the axles 36 are raised to upper ends of the slots 34, the bed formed by the roller 38 will be presented above the stop member 32, yet still below the upper edges of the sideplates 28. Below the rollers 38, brake members 40 (FIG. 5) are attached to the flanges 30 by means of adjusting bolts 42 and nuts 44, and these members 40 are provided with brakeshoes 46 which engage the undersides of the rollers 38 when the axles 36 are in the lower ends of their slots 34. Accordingly, the brakeshoes 46 impede rotation of the rollers 38 when the rollers 38 are in their lower position.

Beyond the rollers 38 the sideplates 28 are connected by fixed axles 48 which are presented in approximately the same plane as the shiftable axles 36 when the rollers 38 are in engagement with the brakeshoes 46, and journaled on the fixed axles 48 are rollers 50 which are diametrally equal in size to the rollers 38. Consequently, the upper surface of the storage bed formed by the rollers 50 will be substantially coplanar with the upper surface of the storage bed formed by the rollers 38 when the latter rollers are in engagement with the brakeshoes 46.

Figure 6:
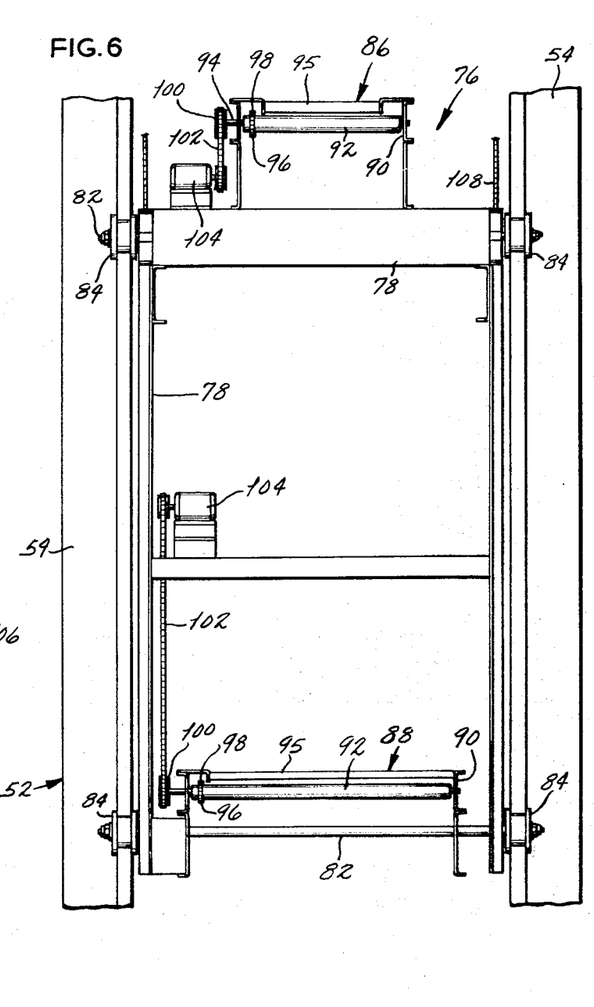
FIG. 6 is an end elevational view of the charging car taken along lines 6—6 of FIG. 3.

AS will be seen by reference to FIGS. 1, 3 and 6, the charging unit 6 includes a carriage-forming lift frame 52 formed in part from a pair of upstanding track members 54 which spaced-apart and interconnected at the lower ends by a base 56. Journaled on the base 56 outwardly from the upstanding members 54 are a pair of wheels 58, one of which is connected to a drive motor 60 on the base 56 through a drive chain. The wheels 58, in turn, ride upon a floor track 64 attached to the floor of the warehouse 14 in outwardly spaced relation to the charging side of the rack 8. At their upper ends the upstanding members 54 are connected to an upper frame 70 which projects laterally toward a rack 8 and is fitted with a pair of guide wheels 72, engageable with an upper track 74 connected across the upper ends of the outermost upstanding support members 20 on the rack 8.

The lift frame 52 carries a charging car 76 including a car frame 78 traversed at its upper and lower ends by pairs of axles 82 which project outwardly along the sides of the track members 54. The axles 82 are fitted with flanged wheel 84 which engage opposite rails on the track members 54 and restrain the car 76 from shifting in any horizontal direction with respect to the lift frame 52. Mounted on the car frame 78 are upper and lower charging conveyors 86 and 88, respectively, both of which comprise a pair of parallel horizontal channels 90 having rollers 92, which form a supporting bed, journaled intermediate their upstanding webs on axles 94. At their ends outermost from the rack 8 the channels 90 are connected by an abutment member 95 located above the upper surface of a bed defined by the rollers 92. Adjacent to one of the channels 90, the rollers 92 are provided with sprockets 96 which are connected to one another by a chain 98. The end roller 92 of each charging conveyor 86 and 88 is provided with an additional sprocket 100 over which a drive chain 102 is trained for connecting it to a charging motor 104, also mounted on the car frame 78. The car 76 is raised and lowered on lift frame 52 between the upstanding track members 54 thereof by means of an elevating motor 106 mounted on the lift frame 52. The elevating receiving 106 is connected to the car 76 through a pair of chains 108 (FIG. 6) which extend upwardly along the track members 54 to the upper frame 70 and thence downwardly, attaching to the car frame 78 at their opposite ends.

REferring again to FIGS. 2 and 3, the retrieving unit 10 comprises a carriage forming lift frame 122 which is very similar to the lift frame 52 and includes upstanding track members 124, a base member 126, and wheels 128 powered by a carriage motor 130 through a chain 132. The upstanding track members 124 are similarly interconnected at their upper ends by an upper crossbeam 134, at which point the lift frame 112 is also provided with an upper frame 138, having guide wheels 140 journaled on it. The wheels 128 ride on a floor track 142 located on the floor of the warehouse 14 outwardly from the retrieving side of the rack 8, while the guide wheels 140 follow an upper track 144 connected to and extending across the upper ends of the outermost upstanding support members 20 on the retrieving side of the rack 8.

Figure 7:
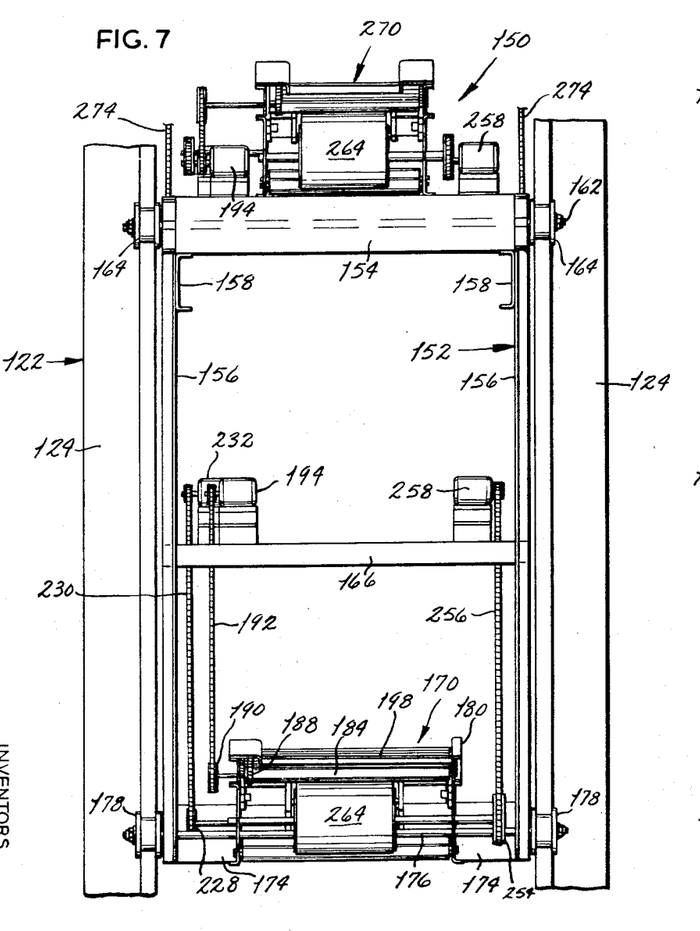
FIG. 7 is an end elevational view of the retrieval car taken along line 7—7 of FIG. 3.
Figure 8:
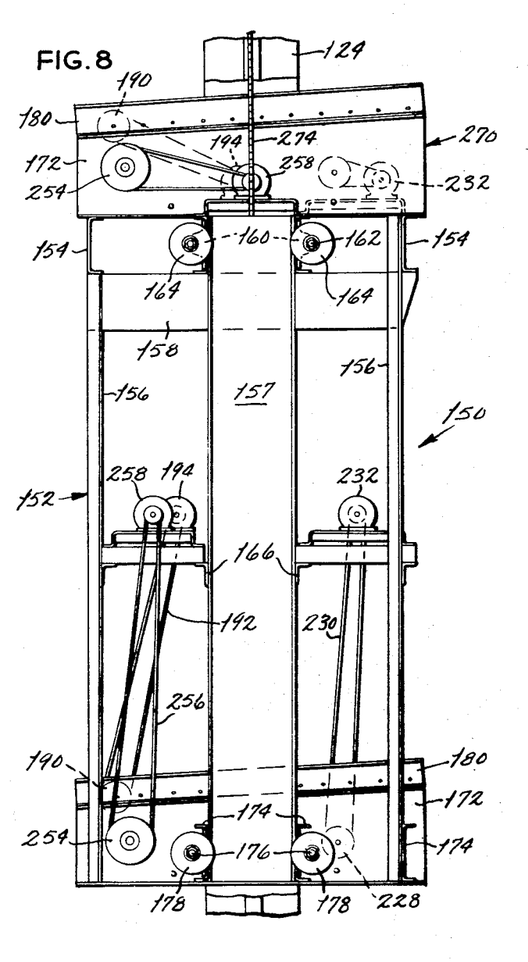
FIG. 8 is a side elevational view of the retrieval car.

The lift frame 122 carries a retrieval car 150 (FIGS. 7 and 8) including a car frame 152 consisting of four horizontal upper channels 154 having vertical angles 156 and channels 157 depending from their ends. Beneath the channels 154 the vertical angles 156 and channels 157 are secured to cross channels 158, and secured to the webs of two inner upper channels 154 above the cross channels 158 are pillow blocks 160 through which axles 162 extend. The axles 162 project outwardly along the side of the upstanding track members 124 of the lift frame 122 where they are provided with flanged guide wheels 164 which engage the track members 124, the flanges of the wheels 164 spanning the rails on the track members 124 to prevent horizontal displacement of the car 150 with respect to the lift frame 122. Downwardly from the upper horizontal channel 154 are depending angles 156 and channels 157 are interconnected by intermediate cross angles 166.

At its lower end the car frame 152 carries a lower retriever 170 (FIG. 9-11) including a pair of mounting channels 172, the webs of which are connected to the lower ends of the vertical angles 156 and channels 157 by short laterally projecting connecting channels 174. The lower flanges of the mounting channels 172 are coplanar and horizontal, while their upper flanges are inclined downwardly away from the retrieval side of the rack 8 at an angle substantially equal to the inclination of storage conveyors 26 on the rack 8. The mounting channels 172 support a pair of axles 176 which are fitted with flanged wheels 178, engageable with the upstanding track members 124. The wheels 178 together with the wheels 164 guide the car 150 on the lift frame 122.

Figure 9:
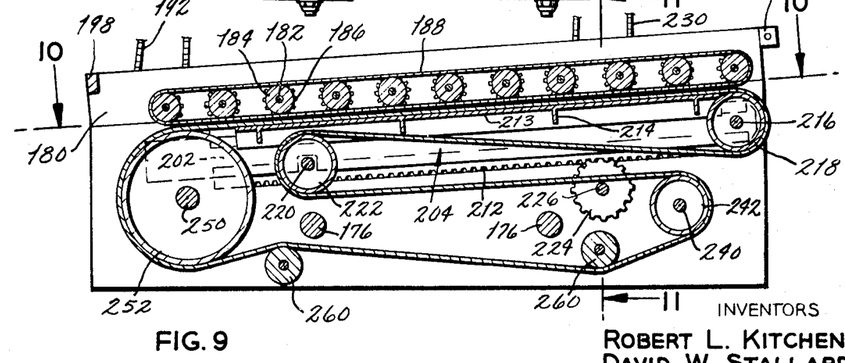
FIG. 9 is a longitudinal sectional view of a retriever forming part of the present invention.

Bolted to the inclined upper flanges of mounting channels 172 are conveyor support channels 180, the webs of which carry a plurality of spaced axles 182 having rollers 184 mounted on them. The rollers 184 are provided with sprockets 186 over which a chain 188 is trained so that they rotate in unison. The axle 182 of one of the rollers 184 is fitted with an additional sprocket 190 which is connected by means of a chain 192 to a conveyor motor 194 on a mounting plate extending between two of the intermediate cross angles 166 on the car frame 152. Beyond the roller 184 located outermost from the rack 8, the conveyor support channels 180 are spanned by a stop or abutment member 198 which projects upwardly beyond the upper surface of the supporting or receiving bed formed by the rollers 184. At their opposite ends the channels 180 support an electric eye 199 located adjacent to the retrieving side of the rack 8 for sensing when an item has passed from a storage conveyor 26 to the rollers 184 of the lower retriever 170, as will presently be explained in more detail.

Bolted to the inwardly presented faces of the webs on mounting channels 172 are spaced guide bars 200 which form a slideway 202 (FIG. 11) into which the sides of an extractor slide 204 are fitted. More specifically, the slide 204 includes a pair of slide bars 206 fitted between the guide bars 200 and into the slideway 202. Projecting toward one another from the slide bars 206 are a plurality of connecting elements 210 which are attached at their opposite ends to a pair of spaced rack bars 212 having gear teeth cut into their downwardly presented surfaces. Intermediate their ends, the rack bars 212 are interconnected by a slide plate 213 reinforced by a plurality of ribs 214, all of which rigidify the slide 204 and maintain the rack bars 212 in predetermined spaced relation. At their extreme outer ends the race bars 212 are fitted with an axle 216 on which an outer belt roller 218 is journaled and inwardly from the roller 218, in close proximity to the inner end of the slide 204, the rack bars 212 are fitted with another axle 220 on which an inner belt roller 222 is journaled. Accordingly, the slide 204, and along with it the rollers 218 and 222, shift laterally with respect to the car 150, the maximum extension of the slide 204 beyond the car 150 being sufficient to bring the outer belt roller 218 into the rack 8 to a point slightly beyond the innermost shiftable roller 38 on any one of the storage conveyors 26. In this connection, it should be noted that the portion of the slide 204 which projects outwardly from the main body of the car 150 is narrower than the distance between the brake members 40 on the storage conveyors 26 so that the slide 204 can fit into the spaces between the members 40 and engage the rollers 34, all for purposes presently more fully appearing. The slide 204 is extended and retracted by a pair of spur gears 224 which engage the teeth on the lower surface of the rack bars 212, and these gears 224 are keyed to a slide drive shaft 226 which extends between and is journaled in the webs of the mounting channels 172. Outwardly, beyond one of the mounting channels 122, the shaft 226 is provided with a sprocket 228 which is connected by means of a chain 230 to a slide motor 232 on a mounting plate affixed to the intermediate cross angles 166 of the car frame 152.

Near their forward ends the webs of the mounting channels 172 are provided with brackets 236 (FIG. 10) which carry shiftable axle mounts 238 into which the ends of an axle 240 are fitted. The axle 240, in turn, carries an end roller 242, the upper surface of which is located at approximately the same distance below the upper flanges of the mounting channel 172 as is the lower surface of the inner belt roller 222. The exact longitudinal position of the axle mounts 238 on their respective brackets 226 can be altered by means of adjusting screws 244 threaded into the brackets 236.

At the opposite ends of the mounting channels 172, the webs of those channels 172 carry pillow blocks 248 in which a drive shaft 250 is journaled, and keyed to the shaft 240 between the channels 172 is a drive roller 252, the upper surface of which, like the outer belt roller 218, lies in the plane defined by the upper surface of the slide plate 213. Beyond one of the mounting channels 172, the drive shaft 250 is provided with a sprocket 254 over which a chain 256 is trained. The chain 256, in turn, connects the shaft 252 with a belt motor 258 bolted to a mounting plate on the cross angles 166.

Between the drive roller 252 and the adjustable end roller 240, the mounting channels carry a pair of spring-loaded-idler rollers 260 adapted to shift longitudinally on the channels 272, and trained around the rollers 252, 260, 240, 222 and 218 as well as across the slide plate 214 (FIG. 9) is a roller drive belt 264 formed from a flexible material having a relatively high coefficient of friction.

The retrieval car 150 is further provided with an upper retriever 270 (FIGS. 7 and 8) which is very similar to the lower retriever 170, only it is not as wide. It will therefore not be described in greater detail, other than to note that the mounting channels 172 of the upper retriever 270 are bolted to the horizontal upper channels 154 of the car frame 152 as are the mounting plates on which its motors 194, 232 and 258 are mounted.

The retrieval car 150 is elevated and lowered by an elevating motor 272 on the lift frame 122, and that motor 272 drives chains 274 which are trained over sprockets 276 on the frame 122 and are connected to the car frame 152 adjacent to the upstanding track members 124.

Finally, the warehousing device 2 includes a control system (not shown) operable through the control console 18 for moving the charging car 76 from a loading position opposite the end of the infeed conveyor 12 (FIG. 1) to the charging end of any of of the storage conveyor 26. In this connection, it should be noted that the upper charging conveyor 86 services the storage conveyors 26 on the approximate upper half of the rack 8, while the lower charging conveyor 88 services the storage conveyors 26 at the lower end of the rack 8. To accomplish this the control system operates each motor 60, 104 and 106 in a programmed sequence. The control system must further move the retrieval car 150 from positions opposite the retrieval ends of the storage conveyors 26 to the discharge conveyor 12, and to accomplish this it must energize the motors 130, 272, 194, 232 and 258 in a programmed sequence to be more fully described. Generally, the lower retriever 170 services the lower storage conveyors 26 on the rack 8, while the upper retriever 270 services the upper conveyors 26.

The infeed conveyor 4 is preferably of the live roller, drag chain, or endless belt variety, while the discharge conveyor 12 may be the same or gravity operated.

In operation individual items 280 consigned for storage in the warehousing device 2 are placed at a remote location on the infeed conveyor 4, and as these items 280 pass the operator he makes an entry in his inventory record. He also programs the control system through the control console 18 to deliver each item 280 to a particular storage conveyor 26. If the charging unit 6 is not already at the end of the infeed conveyor 4, it will receive a call from the control system which will dispatch it to that point. In such a case, the carriage motor 60 moves the lift frame 52 along the floor track 64 and the upper track 74 until it is aligned with the infeed conveyor 4. At the same time, the elevating motor 104 will shift the charging car 76 vertically so that either the upper charging conveyor 86 or the lower charging conveyor 88 aligns with the infeed conveyor 4 for reception of the item 280, the particular conveyor used being dependent on the destination of the item 280. If the item 280 is large, it will probably be stored on one of the lower storage conveyors 26. On the other hand, if it is small, it will probably be stored on one of the upper storage conveyors 26. In any event, whether the upper charging conveyor 86 or the lower charging conveyor 88 is employed is entirely dependent on where the particular type of item 280 is stored in the rack 8, and once a storage conveyor 26 has been assigned for such items 280, the control system selects the charging conveyor 86 or 88 to deliver that item 280 to the rack 8. Assuming that identical items 280 are stored on a storage conveyor 26 located in the lower part of the rack 8, then the lower charging conveyor 88 will align with the infeed conveyor 4. At this time, the retractable gate 16 at the end of the infeed conveyor 4 will be shifted aside and the rollers 92 on the lower charging conveyor 86 will be energized by the charging motor 104. Consequently, the item 280 will be powered onto and across the charging conveyor 88 until it comes against the end abutment member 95, at which time the control system will deenergize the motor 104 and along with it, the rollers 92. Thereafter, both the carriage motor 60 and the elevating motor 106 are energized, so that the lift frame 252 moves along the charging side of the rack 8, while at the same time the charging car 76 moves upwardly or downwardly to the level of the particular storage conveyor 26 to which the item 280 has been assigned. Once the lower charging conveyor 88 aligns with that particular storage conveyor 26, the motors 60 and 104 cease to operate, and the charging motor 104 will be energized in the opposite direction so that the rollers 92 power the item 280 toward and onto the selected storage conveyor 26.

Once the item 280 passes completely onto the charging end of the storage conveyor 26, it will move along the inclined conveyor 26 until it engages the last item 280 already on the conveyor 26. If no other items 280 are on the conveyor 26, the item 280 will roll freely along the storage bed formed by the fixed rollers 50 until it encounters the shiftable rollers 38, at which point its advancement will be retarded by reason of the fact that the shiftable rollers 38 frictionally engage the brakeshoes 45 and therefore do not roll as freely as the rollers 50. The frictional engagement between the rollers 38 and the shoes 46 is such that the item 280 decelerates as it passes over the rollers 38, yet retains sufficient momentum to bring it against the stop member 32. This can be adjusted by manipulation of the adjusting bolts 42 and nuts 44.

Figure 12:
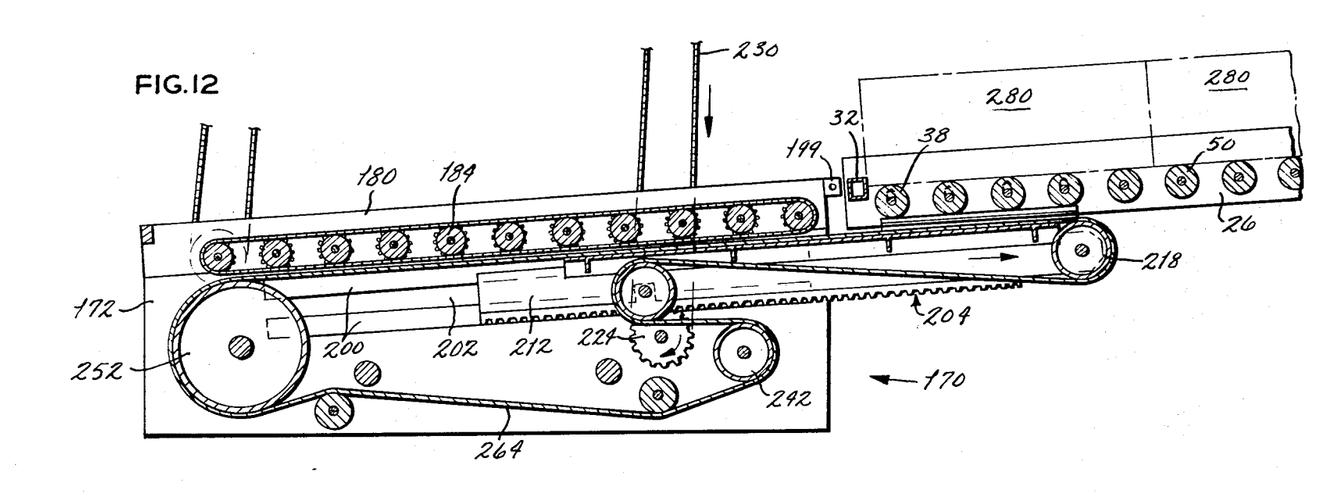
FIG. 12 is a sectional view of a retriever showing its extractor slide projecting into the storage rack.
Figure 13:
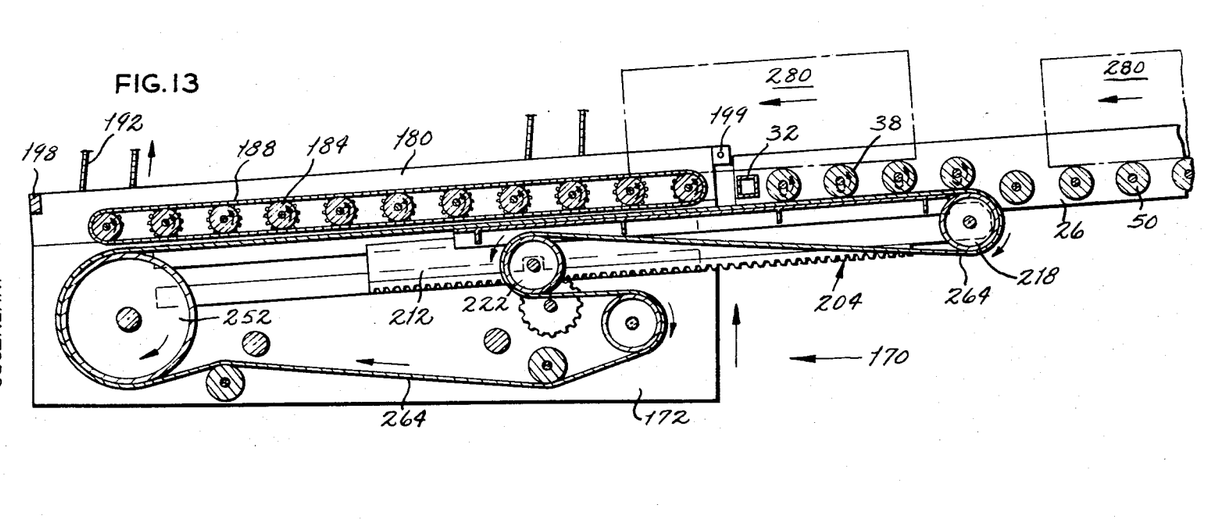
FIG. 13 is a sectional view of a retriever powering items from the storage rack onto the supporting bed of the retriever.

When the operator receives an order for item 280 he programs the control system through the control console 18 to extract the item 280 and place it on the discharge conveyor 12. More specifically, the control system will energize the carriage motor 130 so that it moves the lift frame 122 along the tracks 142 and 144 until it aligns with the retrieving end of the selected storage conveyor 26. At the same time, the control system will energize the elevating motor 272 until that motor brings the upper surface of the extractor belt 264 on the lower retriever 170 to a position slightly below the undersides of the rollers 38 on the conveyor 26, at which point the retrieving conveyor rollers 184 will be located outwardly form, and slightly below the rollers 38 and 50. Next, the control system energizes the slide motor 232 and it rotates the spur gears 224 causing the extractor slide 204, and along with it the extractor belt 264, to project into the rack 8 below the storage conveyor 26 on which item 280 is resting (FIG. 12). When the extractor slide 204 is fully extended, the elevating motor 272 is again energized, and this brings the car 150 upwardly, causing the extractor belt 264 to engage the undersides of the rollers 38 and lift them upwardly (FIG. 13). The upward movement of the car 150 terminates when the shiftable axles 36 reach the upper ends of their slots 34, and when this occurs, the bed defined by the upper surfaces of the rollers 38 will be presented above the stop member 32 and in alignment with the supporting bed formed by the rollers 184 on the lower retriever 170. Next, the belt motor 258 and the conveyor motor 194 are energized, and the moving extractor belt 264 will impart rotation to the rollers 38, powering the item 280 off of the storage conveyor 26 and onto the rollers 184 which form receiving means on the retriever 170. Since the rollers 184 rotate, the item 280 will be carried across the lower retriever 170. Once the item 280 clears the electric eye 199, a signal will be sent to the control system which will stop the belt sent to the control system which will stop the belt motor 258 and the belt 264, but the conveyor motor 194 and rollers 184 will continue to operate until the item 280 reaches the abutment member 198, thereby insuring that the item 280 rests solidly on the lower retriever 170. The first or innermost of the raised rollers 38 serves as a temporary stop and prevents succeeding items 280 on the conveyor 26 from proceeding forwardly onto the rollers 184. Thereafter, the retrieving car 150 is lowered sufficiently to free the extractor belt 264 from the rollers 38, and the slide motor 232 is then energized in the opposite direction to retract the extractor slide 204 into the main body of the lower retriever 170. Once the rollers 38 are again in their lower position, the succeeding item 280 on the rollers 50 moves across the lowered rollers 38 and into engagement with the stop member 32 for retrieval during a subsequent retrieval operation.

Thereafter, the carriage motor 130 moves the lift frame 122 along the track 142 until it aligns with the discharge conveyor 12, while at the same time, the elevating motor 272 either raises or lowers the retrieval car 150 until the rollers 184 of its lower retriever 170 are at approximately the same height as the end of the discharge conveyor 12. Once the lower retriever 170 aligns with the discharge conveyor 12, the control system energizes the conveyor motor 194 and powers the item 280 off onto the discharge conveyor 12 where the operator can observe it as it passes and adjust his inventory record accordingly. The discharge conveyor 12 carries the item 280 to a shipping area or even directly to the individual who ordered it.

If two or more items 280 have been ordered, they can be loaded onto the receiving bed formed by the rollers 184 if there is sufficient room available In such an instance, after the first load is powered onto the rollers 184, the car 150 will shift downwardly a slight distance moving the belt 264 away from the rollers 38 as in the normal sequence of operation. However, instead of the extractor slide 204 retracting at this point, the car 150 again moves upwardly causing the belt 264 to again lift and rotate the rollers 38 so as to move another item 280 onto the rollers 184. The foregoing sequence is repeated until the rollers 284 can hold no more items 280, at which time the extractor slide 204 is retracted and the lift frame 122 and retrieval car 150 are moved into alignment with the discharge conveyor 12.

If the item 280 is stored on an upper storage conveyor 26 of the rack 8, the upper charging conveyor 86 and the upper retriever 270 will be employed, and they operate similar to the lower conveyor 80 and lower retriever 170, respectively, as previously described.

This invention is intended to cover all changes and modifications of the example of the invention herein chosen for purposes of the disclosure which do not constitute departures from the spirit and scope of the invention.

What is claimed is:

1. Storage and retrieving means comprising a storage rack having a storage bed on which stored items rest, the bed having at least one roller on which a stored item rests; a frame movable with respect to the rack; receiving means carried by the frame for receiving and supporting an item from the rack; an extractor slide mounted on the frame for movement from an extended position wherein it projects beyond the end of the bed to a retracted position wherein it is withdrawn from the rack and bed roller; first drive means for extending and retracting the slide; inner and outer rollers carried by the extractor slide and rotatable about axes fixed with respect to the slide; a drive roller and an idler roller carried by the frame and rotatable about axes fixed with respect to the frame; and endless belt trained around the drive roller, outer roller, inner roller, and idler roller; second drive means for moving the belt around the drive, outer, inner, and idler rollers; the belt being engageable with the bed roller when the slide is extended for revolving the bed roller such that the item resting thereon is shifted toward the receiving means; and third drive means for moving the frame upwardly and downwardly so that the belt can be brought into engagement with the withdrawn from the bed roller 2. Storage and retrieving means comprising a storage rack having a storage bed on which stored items rest and including a plurality of rollers, the upwardly presented surfaces of which define a substantially planar surface which is inclined upwardly away from the end of the bed from which the items are discharged, the rollers being shiftable upwardly and downwardly between a loading position and a normal position; a frame movable with respect to the rack; receiving means carried by the frame for receiving and supporting an item discharged from the rack; a fixed stop located between the receiving means and the rollers, the slop being presented above the upper surfaces of the rollers when the rollers are in their normal position so as to prevent items from moving toward the receiving means, the stop being presented below the upper surfaces of the rollers when the rollers are in their loading position so that the stop does not obstruct the passage of items from the bed to the receiving means; and extractor means carried by the frame and including an endless belt which engages the rollers, lifts them upwardly to their loading position, and rotates them such that the item is moved over the top of the stop and onto the receiving means.

3. A retrieving unit according to claim 2 wherein the receiving means comprises a plurality of receiving rollers and means for rotating the receiving rollers such that the item when it moves onto them will be moved away from the storage rack.

4. A retrieving unit according to claim 3 wherein the extractor means is further characterized by an extractor slide on which at least a portion of the belt is carried, the extractor slide being shiftable from a retracted position wherein it is located outwardly from the rack to an extended position wherein it projects beneath the shiftable rollers of the bed, and wherein elevating means are provided for raising and lowering the frame, whereby the belt can be brought into engagement with and will raise rollers bed.

5. A storage and retrieving means according to claim 4 wherein the rack includes a plurality of vertically and horizontally spaced storage beds and wherein means are provided for moving the frame horizontally parallel to the rack, whereby the receiving means and extractor means can align with an selected storage bed.

6. Storage and retrieving means comprising a storage rack having a storage bed on which stored items rest and a stop at the end of the bed for preventing items from leaving the bed, the bed including at least one roller which underlies and engages an item and is shiftable relative to the stop; a frame movable with respect to the rack; receiving means carried by the frame for receiving and supporting an item from the rack; and extractor means carried by the frame and including an endless belt engageable with the roller for lifting the roller to a position in which the item thereon will clear the stop and for revolving the roller such that the item is shifted toward and onto the receiving means.

UNITED STATES PATENT OFFICE
CERTIFICATE OF CORRECTION

Patent No. __3,610,445__                Dated __October 5, 1971__

Inventor(s)__ Robert L. Kitchen and David W. Stallard__

It is certified that error appears in the above-identified patent and that said Letters Patent are hereby corrected as shown below:

Col. 1, line 12, cancel "relay" and substitute therefor -- "rely".

Figure 10:
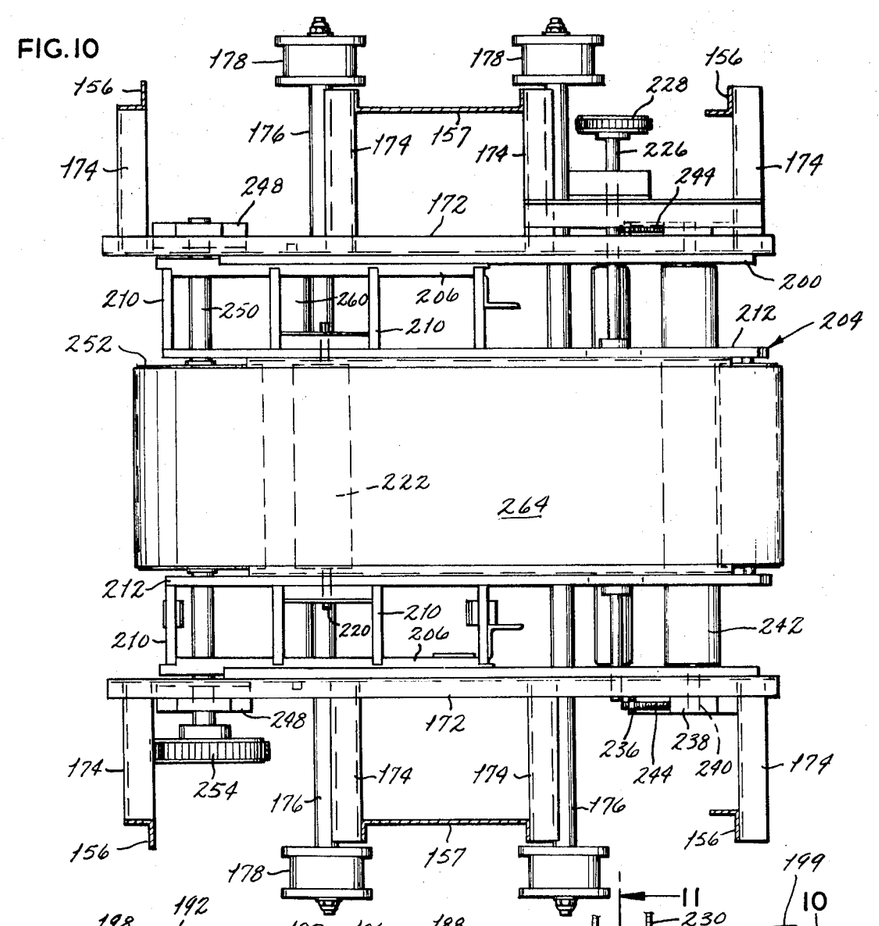
Figure 11:
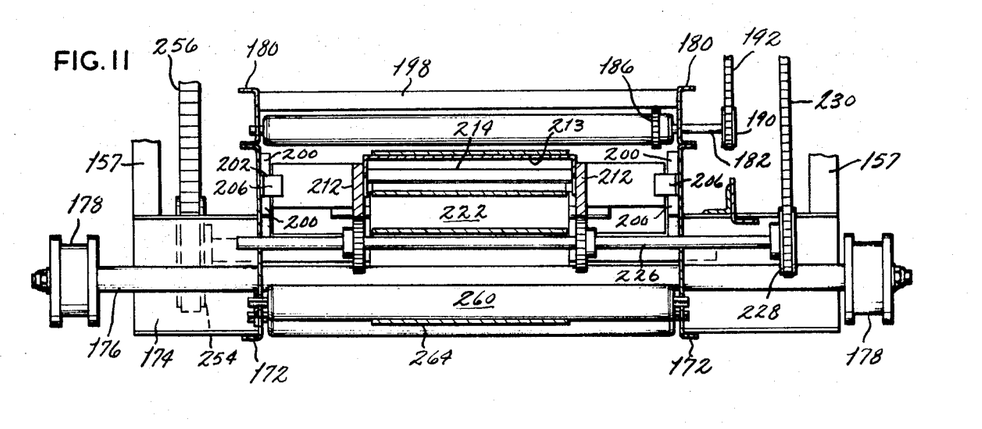

Col. 1, line 68, at the beginning of the line, cancel "10-10" and substitute therefor -- "Fig. 10".

Col. 2, line 23, "as seen side", at the end of the line, should be cancelled.

Col. 2, lines 42-44, after the numeral "38" in line 42, cancel the remainder of the line, cancel line 43 in its entirety, and up to and including the numeral "38" in line 44.

Col. 2, line 69, after "which" at the end of the line, add -- "are".

Col. 3, line 30, after "elevating", cancel "receiving" and substitute therefor -- "motor"

Col. 3, line 66, after "end" cancel "of".

Col. 3, line 74, before "storage", insert "the".

Col. 4, line 4, after "of" and before "mounting", insert -- the --.

Col. 5, line 13 cancel the numeral "214" and substitute therefor -- "213".

Col. 5, line 34, after "any" (at the beginning of the line", cancel "of" (first occurrence), and substitute therefor -- "one".

UNITED STATES PATENT OFFICE
CERTIFICATE OF CORRECTION

PAGE - 2

Patent No. 3,610,445      Dated October 5, 1971

Inventor(s) Robert L. Kitchen and David W. Stallard

It is certified that error appears in the above-identified patent and that said Letters Patent are hereby corrected as shown below:

Col. 6, line 49, cancel "form" and substitute therefor -- "from".

Col. 6, line 73, after "will be", cancel the remainder of the line (beginning with "sent").

Col. 8, line 9 -- after "with", cancel "the" and substitute therefor -- "and".

Col. 8, line 21, before "being", cancel "slop" and substitute therefor -- "stop".

Col. 8, line 44 -- after "rollers" and before "bed", insert -- "of the".

Signed and sealed this 9th day of May 1972.

(SEAL)
Attest:

EDWARD M. FLETCHER, JR.      ROBERT GOTTSCHALK
Attesting Officer      Commissioner of Patents